United States Patent [19]

Macko et al.

[11] Patent Number: 5,436,621
[45] Date of Patent: Jul. 25, 1995

[54] MESSAGING PERIPHERAL WITH SECURE MESSAGE DATA FUNCTION

[75] Inventors: William J. Macko, West Palm Beach; Greg Cannon, Delray Beach, both of Fla.

[73] Assignee: Motorola, Inc., Schaumburg, Ill.

[21] Appl. No.: 84,905

[22] Filed: Jul. 2, 1993

[51] Int. Cl.⁶ ............................ H04Q 7/18; G08B 5/22
[52] U.S. Cl. ............................ 340/825.44; 340/825.27; 340/825.34
[58] Field of Search ..................... 340/825.44, 825.34, 340/825.31, 825.27, 311.1; 379/59

[56] References Cited

U.S. PATENT DOCUMENTS

| | | | |
|---|---|---|---|
| 4,806,906 | 2/1989 | Oda et al. | 340/825.44 |
| 4,839,628 | 6/1989 | Davis et al. | 340/311.1 |
| 4,857,883 | 8/1989 | Mama | 340/311.1 |
| 5,012,234 | 4/1991 | Dulaney et al. | 340/825.31 |
| 5,043,721 | 8/1991 | May | 340/825.44 |
| 5,060,263 | 10/1991 | Bosen et al. | 340/825.31 |
| 5,073,767 | 12/1991 | Holmes et al. | 340/825.44 |
| 5,146,217 | 9/1992 | Holmes et al. | 340/825.34 |
| 5,151,694 | 9/1992 | Yamasaki | 340/825.44 |
| 5,281,962 | 1/1994 | Vanden Heuvel et al. | 340/825.27 |
| 5,302,947 | 4/1994 | Fuller et al. | 340/825.44 |

FOREIGN PATENT DOCUMENTS

90/13213 11/1990 WIPO .

OTHER PUBLICATIONS

PC Card Standard Release 2.0, Personal Computer Memory Card International Association, Sep. 1991.

*Primary Examiner*—Donald J. Yusko
*Assistant Examiner*—Mark H. Rinehart
*Attorney, Agent, or Firm*—Gregg E. Rasor

[57] ABSTRACT

A messaging peripheral (100) includes a processor (106) for executing a microcode program that controls operation of the messaging peripheral (100), and a PCMCIA memory only interface (119) that allows communication of communication of at least one message and a user selectable password between an electronic information processing device (200) and the messaging peripheral (100). The PCMCIA memory only interface couples to a secure memory access interface that is controlled by the processor (106). The secure memory access interface (703) allows the electronic information processing device (200) to access the at least one message when a memory protection mode is selected and the processor (106) receives a user entered password and performs a correlation between the user entered password and the user selectable password.

18 Claims, 8 Drawing Sheets

| Pin | Signal | I/O | Function | +/- |
|---|---|---|---|---|
| 1 | GND | | Ground | |
| 2 | D3 | I/O | Data bit 3 | |
| 3 | D4 | I/O | Data bit 4 | |
| 4 | D5 | I/O | Data bit 5 | |
| 5 | D6 | I/O | Data bit 6 | |
| 6 | D7 | I/O | Data bit 7 | |
| 7 | CE1 | I | Card enable | - |
| 8 | A10 | I | Address bit 10 | |
| 9 | OE | I | Output enable | - |
| 10 | A11 | I | Address bit 11 | |
| 11 | A9 | I | Address bit 9 | |
| 12 | A8 | I | Address bit 8 | |
| 13 | A13 | I | Address bit 13 | |
| 14 | A14 | I | Address bit 14 | |
| 15 | WE/PGM | I | Write enable | - |
| 16 | RDY/BSY | O | Ready/Busy | +/- |
| 17 | Vcc | | Power Supply | |
| 18 | Vpp1 | | Programming and Peripheral Supply | |
| 19 | A16 | I | Address bit 16 | |
| 20 | A15 | I | Address bit 15 | |
| 21 | A12 | I | Address bit 12 | |
| 22 | A7 | I | Address bit 7 | |
| 23 | A6 | I | Address bit 6 | |
| 24 | A5 | I | Address bit 5 | |
| 25 | A4 | I | Address bit 4 | |
| 26 | A3 | I | Address bit 3 | |
| 27 | A2 | I | Address bit 2 | |
| 28 | A1 | I | Address bit 1 | |
| 29 | A0 | I | Address bit 0 | |
| 30 | D0 | I/O | Data bit 0 | |
| 31 | D1 | I/O | Data bit 1 | |
| 32 | D2 | I/O | Data bit 2 | |
| 33 | WP | O | Write protect | - |
| 34 | GND | | Ground | |

*FIG. 3*

| Pin | Signal | I/O | Function | +/- |
|---|---|---|---|---|
| 35 | GND | | Ground | |
| 36 | CD1 | O | Card Detect | - |
| 37 | D11 | I/O | Data bit 11 | |
| 38 | D12 | I/O | Data bit 12 | |
| 39 | D13 | I/O | Data bit 13 | |
| 40 | D14 | I/O | Data bit 14 | |
| 41 | D15 | I/O | Data bit 15 | |
| 42 | CE2 | I | Card enable | - |
| 43 | RFSH | I | Refresh | |
| 44 | RFU | | Reserved | |
| 45 | RFU | | Reserved | |
| 46 | A17 | I | Address bit 17 | |
| 47 | A18 | I | Address bit 18 | |
| 48 | A19 | I | Address bit 19 | |
| 49 | A20 | I | Address bit 20 | |
| 50 | A21 | I | Address bit 21 | |
| 51 | Vcc | | Power Supply | |
| 52 | Vpp2 | | Programming and Peripheral Supply 2 | |
| 53 | A22 | I | Address bit 22 | |
| 54 | A23 | I | Address bit 23 | |
| 55 | A24 | I | Address bit 24 | |
| 56 | A25 | I | Address bit 25 | |
| 57 | RFU | | Reserved | |
| 58 | RESET | I | Card Reset | + |
| 59 | WAIT | O | Extend bus cycle | - |
| 60 | RFU | | Reserved | - |
| 61 | REG | I | Register select | - |
| 62 | BVD2 | O | Battery voltage detect 2 | |
| 63 | BVD1 | O | Battery voltage detect 1 | |
| 64 | D8 | I/O | Data bit 8 | |
| 65 | D9 | I/O | Data bit 9 | |
| 66 | D10 | I/O | Data bit 10 | |
| 67 | CD2 | O | Card detect | - |
| 68 | GND | | Ground | |

MESSAGING PERIPHERAL WITH SECURE MESSAGE DATA FUNCTION

FIELD OF THE INVENTION

This invention relates in general to a Personal Computer Memory Card Interface Association (PCMCIA) peripheral and more particularly to a PCMCIA peripheral with selective call messaging capability.

BACKGROUND OF THE INVENTION

Selective call communication (paging) systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information including an address and possibly a data or voice message. When the selective call receiver detects its address, it may alert a user and present message information received.

To implement messaging capability in a paging system, the address and message information referred to are encoded and subsequently transmitted using a protocol such as GSC (Motorola's Golay Sequential Code) or POCSAG (a code from Great Britain's Post Office Code Standardisation Advisory Group). These protocols are adapted to reliably communicate messages to at least one selective call receiver and are well known to one of ordinary skill in the art of paging systems. A typical selective call message may consist of an address signal if the message is a tone only message, or an address signal and a data packet if the message is a data message.

Present selective call receivers operate almost exclusively in a standalone fashion, that is, received messages can only be presented by the receiver's display. Some conventional selective call receivers include a serial data interface for communicating a single received message to an alternate presentation device such as a printer or possibly an electronic advertising sign. Presently, state of the art selective call receiver serial communication systems use a three wire serial interface operating at data rates from 300 to 9600 baud. This serial architecture inherently limits the data bandwidth (speed and information content) between the receiver and a data device. Moreover, since the three wire interface has only transmit data, receive data, and ground connections, any control signals must be encoded as serial data symbols, further slowing response time and limiting the data bandwidth. Lastly, since these interfaces are proprietary in nature, that is, there is no standard for signal levels, data rates, or protocols, data interchange between devices of different manufacturers is all but impossible because of a lack of convention.

Even if a parallel or memory bus scheme is adopted for communicating data between the selective call receiver and the data device, there is still a problem when this is implemented using the PCMCIA memory-only interface standard. By definition, PCMCIA memory-only interface peripherals don't include any means for generating a signal for notifying the data device of a need for service. Moreover, PCMCIA memory-only interface peripherals don't have a native mode that allows for the execution of configuration or service commands useful to interrogate data of a dynamic nature stored within the peripheral. This severe shortcoming limits the usefulness of a memory-only PCMCIA interface peripheral to situations where relatively static data is needed, e.g., as a ROM card or the like.

A final consideration is that the messaging information received by a memory-only PCMCIA interface peripheral may be proprietary in nature. In this case, one may simply remove the memory-only PCMCIA interface peripheral from a first host and insert it into a second host, then read the messaging information. This possibility would allow an unauthorized person to "steal" one's private messages without their knowledge. Similarly, if the memory-only PCMCIA interface peripheral is left in the first host and the owner has left the area, leaving the host unprotected, the unauthorized user may read the authorized user's confidential messaging information.

Consequently, what is needed is a standardized communication interface for state of the art selective call receiver systems that provides a capability to effectively communicate received information between a microcomputer or the like. Additionally, the memory-only PCMCIA interface peripheral should be able to either manually or automatically protect received messages from unauthorized access.

SUMMARY OF THE INVENTION

Briefly, according to the invention, there is provided a messaging peripheral capable of communicating with an electronic information processing device, the messaging peripheral comprising: a processor for executing a microcode program that controls operation of the messaging peripheral; a PCMCIA memory only interface coupled to and controlled by the processor, the PCMCIA memory only interface serving to allow communication of at least one message and a user selectable password between the electronic information processing device and the messaging peripheral, and a secure memory access interface controlled by the processor and coupled to the PCMCIA memory only interface, the secure memory access interface allowing the electronic information processing device to access the at least one message when a memory protection mode is selected and the processor receives a user entered password and performs a correlation between the user entered password and the user selectable password.

BRIEF DESCRIPTION OF THE DRAWINGS

FIG. 3 illustrates a first portion of a PCMCIA memory only interface table listing signals used for communication between the messaging peripheral and electronic information processing device in accordance with the preferred embodiment of the present invention.

FIG. 4 illustrates a second portion of a PCMCIA memory only interface table listing signals used for communication between the messaging peripheral and electronic information processing device in accordance

DESCRIPTION OF A PREFERRED EMBODIMENT

Figure 1:
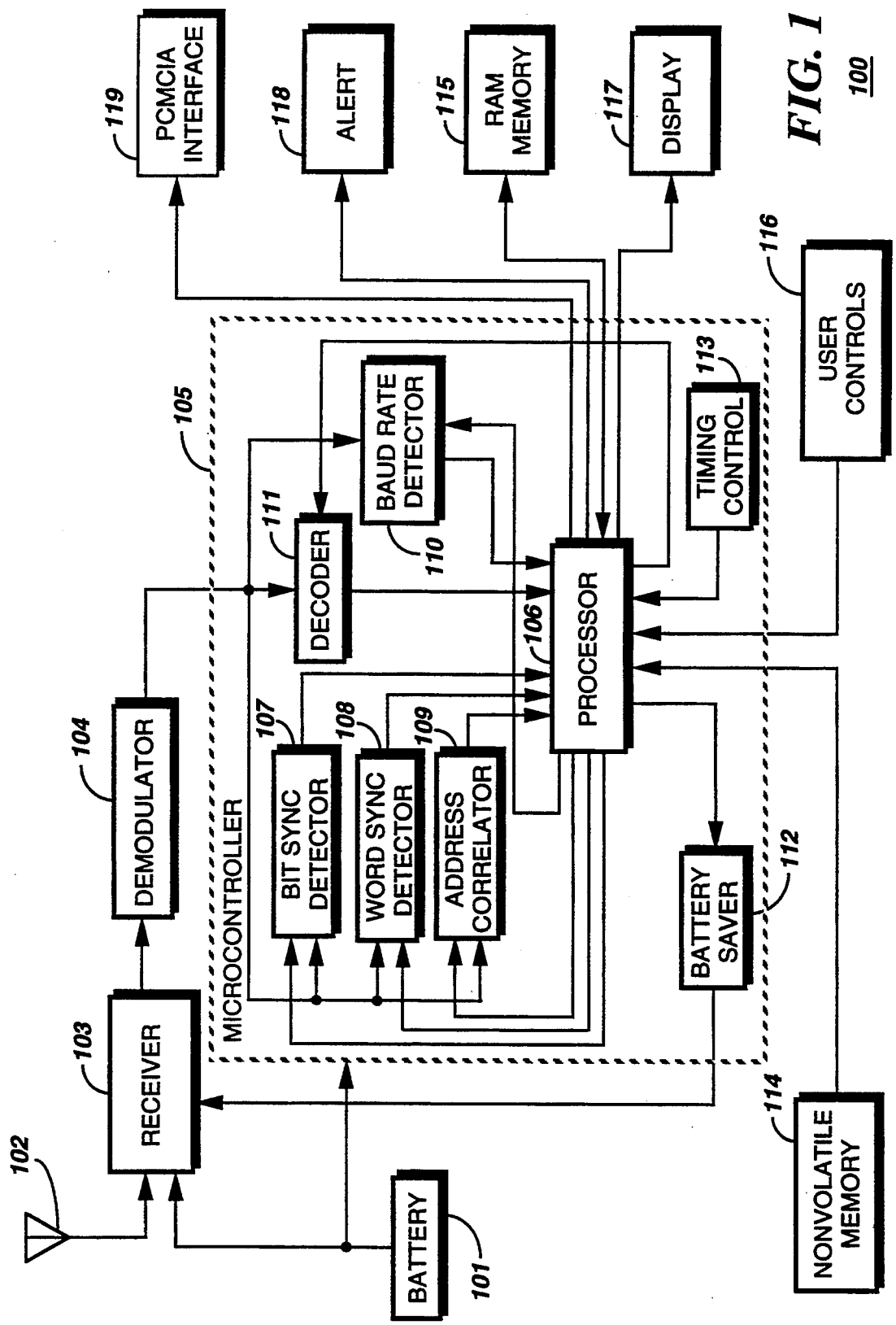
FIG. 1 is a block diagram of a messaging peripheral having a PCMCIA memory only interface configured for operation in accordance with the preferred embodiment of the present invention.

Referring to FIG. 1, a battery 101 powered messaging peripheral 100 operates to receive an information signal via an antenna 102. A receiver 103 couples the received information signal to a conventional demodulator 104 that is capable of recovering analog or digital information. Received digital information is recovered as a serial bit stream that is then coupled to a microcontroller 105 for interpreting and decoding the serial bit stream as address, control, and data signals. In the preferred embodiment, the microcontroller 105 may comprise a processor 106, a bit synchronization detector 107, a word synchronization detector 108, an address correlator 109, a baud rate detector 110, a data decoder 111, a battery saving control circuit 112, and a timing control 113, implemented in hardware, software, or a combination thereof. Examples of commercially available microcontrollers suitable for implementing the preferred embodiment of the present invention are Motorola's MC68HC05xx or M68HC11xx. Complete descriptions of these devices are available in Motorola's data book set entitled "Microprocessor, Microcontroller, and Peripheral Data," volumes I and II, Series A, © 1988 by MOTOROLA, INC.

More specifically, in the microcontroller 105 the serial bit stream is coupled to the baud rate detector 110 that determines a receiving data rate associated with the recovered information. When the receiving data rate is determined, the bit synchronization detector 107 establishes synchronization between the microcontroller's 105 data decoding components (106, 109, and 111) and the individual signals (e.g., address, control, and data signals) in the recovered information. Once bit synchronization is established, the word synchronization detector 108 searches the serial bit stream for information indicating the beginning of a batch or frame. When the microcontroller 105 has established both bit and word synchronization, the recovered information may be searched for a group identification code associated with the messaging peripheral. When a group identification code is found corresponding to the messaging peripheral, it will search only those code frames associated with it's group for pages intended for the messaging peripheral. During the period between like frames, the microcontroller 105 will preferably activate the battery saver 112 to "shut-down" the receiver 103 and demodulator 104, thereby conserving power and extending battery life. The interval between like frames is known in the art as a "sleep" period. Preferably, the system protocol operates such that pages targeted for a specific group identifier, and pages intended for a particular messaging peripheral, are sent only during the transmission of that peripheral's designated paging group, therefore, no pages are missed during the sleep period. A peripheral that operates in this fashion is said to be in a "battery saving" mode.

In determining the selection of the particular messaging peripheral, a correlation is performed between a predetermined address associated with the messaging peripheral and a received address. To accomplish this, the address correlator 109, which comprises a signal processor, performs a comparison between the address signal recovered from the received information signal and a predetermined address associated with the messaging peripheral, generating a detection indicating selection of the messaging peripheral when the recovered address is substantially equivalent to the predetermined address. The predetermined address or addresses associated with the messaging peripheral are preferably stored in the non-volatile memory 114 or code plug. Optionally, the non-volatile memory 114 may reside inside a support integrated circuit (not shown) or in the microcontroller 105. The non-volatile memory 114 typically has a plurality of registers for storing a plurality of configuration words that characterize the operation of the messaging peripheral. When a detection is generated, the microcontroller 105 may generate an alert responsive to a selected alerting mode, e.g., a tone alert would be generated when a tone-only mode is selected. Alternatively, in response to a valid data address correlation and a corresponding detection, the decoder 111 operates to decode at least one message from the received information signal and couples message information to the RAM memory 115.

In accordance with the recovered information, the programmed operating parameters stored in the non-volatile memory 114, and settings associated with the user controls 116, the messaging peripheral may present at least a portion of the message information, such as by a display 117. Alternatively, the user may be alerted that a message has been received by an alert transducer 118 that generates an audible, visual, or tactile alert. The user may view received message information on the display 117 by manually activating an appropriate user control 116 such as a message read control 116.

The microcontroller 105 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to configure the messaging peripheral as requested by a customer.

Figure 2:
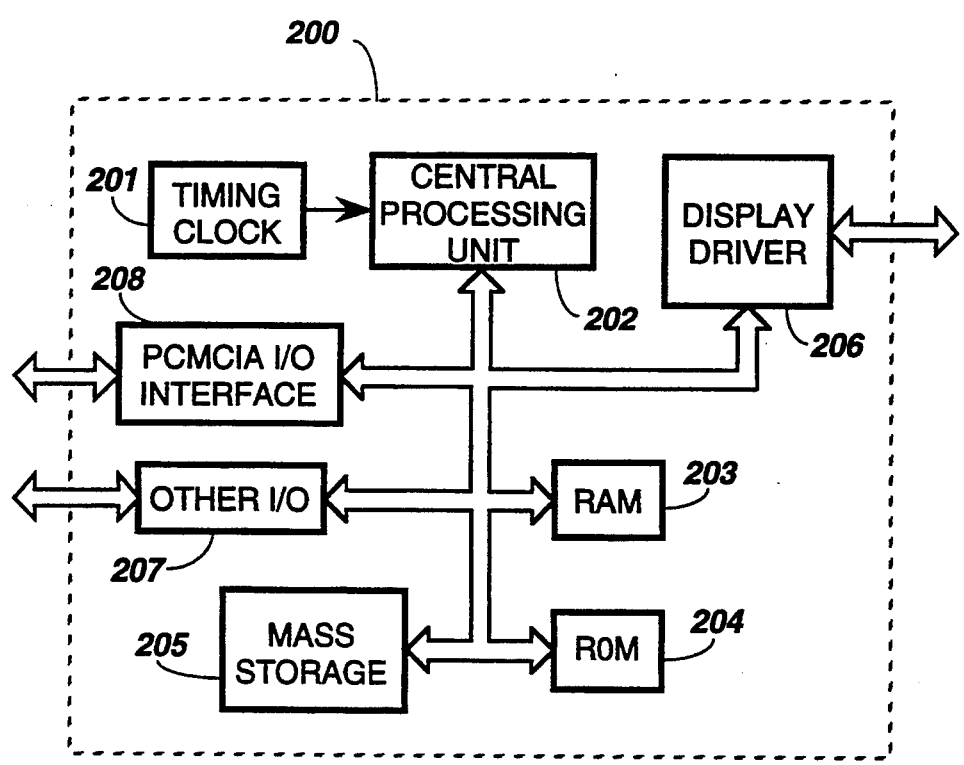
FIG. 2 is a block diagram of an electronic information processing device having a PCMCIA memory only interface configured for operation in accordance with the preferred embodiment of the present invention.

In the preferred embodiment, upon receipt or storage of a message, the microcontroller 105 may communicate the received message to an electronic information processing device (e.g., a host microcomputer or the like as illustrated in FIG. 2) via a PCMCIA interface 119. When coupled to the electronic information processing device 200, the messaging peripheral 100 may operate to automatically deliver received messages in real time, or transfer stored messages to the electronic information processing device for storage, presentation, archival, or the like. Alternatively, a user may via a program executing on the electronic information processing device, download any messages previously received and stored by the messaging peripheral 100 while in the standalone operating mode (separated from the electronic information processing device). In this way, the messaging peripheral 100 gives a paging subscriber the option of operating as a conventional standalone selective call paging receiver, that is, receiving, storing and displaying messages. It is for this reason that the messaging peripheral 100 includes a message read control for recalling the at least one message from the at least one electronic memory 115 for presentation. This allows a user to present the at least one message recalled from the at least one electronic memory 115 on the display 117 in response to activating the message read control 116.

As can be appreciated by one of ordinary skill in the art, this invention can be realized in a number of embodiments of which the disclosed embodiment is only one of many equivalent alternatives.

Referring to FIG. 2, the illustration shows a electronic information processing device 200 having a PCMCIA interface configured for operation in accordance with the preferred embodiment of the present invention. As illustrated, the electronic information processing device 200 comprises a system timing clock 201, central processing unit 202, random access memory (RAM) 203, read only memory (ROM) 204, mass storage (e.g., a disk drive or the like) 205, display driver 206, general I/O interfaces 207, and a PCMCIA memory only interface 208. In the preferred embodiment, the electronic information processing device's PCMCIA memory only interface 208 couples to the messaging peripheral's 100 PCMCIA interface 119. After coupling, messages received by the messaging peripheral 100 may be communicated to the electronic information processing device 200 via the PCMCIA memory only interface 208 and directed to the electronic information processing device's RAM 203, mass storage 205, display driver 206 for presentation on an external display (not shown), or possibly to one of the general I/O interfaces 207 for routing to a printer or the like.

The system formed by coupling the elements depicted in FIG. 1 and FIG. 2 via a PCMCIA memory only interface realizes many advantages over prior art selective call messaging systems. Since the PCMCIA interface is a standard, the messaging peripheral 100 need not be customized for operation with dissimilar host computers supporting the PCMCIA standard. This eliminates the problems associated with proprietary interface standards such as no standard for signal levels, data rates, or protocols, making data interchange between devices of different manufacturers is all but impossible. Another advantage of the PCMCIA interface implemented in the messaging peripheral 100 over the conventional three wire serial communication systems is data throughput. Since the PCMCIA interface can accommodate 16 bit parallel data transfers, and includes DMA (direct memory access) capability, there is a significant increase in data bandwidth as opposed to a 9600 baud, 8 bit, asynchronous serial data link. Moreover, the PCMCIA interface implements dedicated control signals, and may even provide power for the selective call messaging peripheral 100.

Referring to FIG. 3 and FIG. 4, the illustrations show a first and a second portion of a PCMCIA memory only interface table listing signals used for communication between the PCMCIA messaging peripheral and electronic information processing device.

The tables illustrated in FIG. 3 and FIG. 4 detail the PCMCIA memory only interface pinout and signal definitions. The PCMCIA memory only interface standard includes provisions for reading 16-bit data on the low-order 8 bit data bits (useful in conventional 8-bit host systems) and for the interpretation of status information returned by a PCMCIA peripheral card. The principal aspects of the PCMCIA card interface are byte addressability, random access to bytes of data, and the existence of a separate "register" attribute memory space selected by a REG signal. This allows an electronic information processing device to obtain highly detailed peripheral card information such as its manufacturer or a chip-type. The PCMCIA standard also allows access to control registers in configurable types of cards.

The standard PCMCIA interface depicted has a 64-Mbyte addressing capability and numerous hardware provisions to support the various memory technologies, including ROM, OTPROM, UV-EPROM, FLASH, SRAM and PSRAM. I/O-card support is provided in the PCMCIA I/O interface (not shown) by Interrupt, 16-bit cycle, IOread/IOwrite, INput ACK, Reset, Wait, Status Change, Enable and Power signals, some of which are dynamically redefined to these uses once an I/O card is recognized by the host.

All signals in the PCMCIA interface are grouped under four classifications: I (Input), O (Output), I/O (Bidirectional), and R (Reserved). Input signals are those driven by the electronic information processing device and output signals are those driven by the peripheral card.

The Memory-Only Interface supports memory cards, but does not contain signals which support I/O Cards. The preferred embodiment of the present invention implements the Memory-Only Interface as defined by PCMCIA. The signals +RDY/−BSY, WP, BVD1 and BVD2 are present on the Memory-Only Interface but are replaced by other signals when the I/O Interface is selected. The Memory-Only Interface is selected by default in both the socket and the card whenever a card is inserted into a socket, and immediately following the application of Vcc (power) or the RESET signal to a card. After a card's Card Information Structure (CIS) has been interpreted, the card and the socket may be configured, if appropriate, to use the I/O Interface.

PCMCIA peripheral cards may be configured by the electronic information processing device to change the way that their address space is accessed. Before configuring a card, the electronic information processing device must examine the card's CIS to determine the address space and other requirements of the possible card configurations. The electronic information processing device uses this information to select the best configuration from those available in the card, as determined by the electronic information processing device's hardware and software capabilities, as well as the requirements of other cards installed concurrently. Both the electronic information processing device and peripheral card may play a role in determining when the latter is selected. The card includes information in the CIS which tells the host the address decodings the card may be configured to perform. The host then programs the card to perform a particular decoding using the card's Configuration Registers.

The PCMCIA memory only interface signals illustrated in FIG. 3 and FIG. 4 are detailed in the following text along with their functions. Signals A0 through A25 are address-bus-input lines which enable direct address of up to 64 megabytes of memory on the card. Signals D0 through D15 constitute the bidirectional data bus. The -CE1 signal enables even-numbered-address bytes and -CE2 enables odd-numbered-address bytes. A multiplexing scheme based on A0, -CE1 and -CE2 allows 8-bit microcomputer hosts to access all data on D0 through D7 if needed. The −OE line is used to gate Memory Read data from the memory card. The −WE/−PGM input signal is used for strobing Memory Write data into a PCMCIA memory card. This line is also used for memory cards employing programmable memory technologies. A Ready/Busy function is provided by the +RDY/−BSY signals when the peripheral card and the microcomputer host socket are configured for the Memory-Only Interface. The -CD1 and -CD2 signals provide for proper detection of memory-card insertion. Their signal pins are located at opposite ends of the connector to ensure a valid detection (i.e., ensuring both sides of the card are firmly inserted). In a conventional implementation of the PCMCIA memory only interface, the -CD1 and -CD2 signals are connected to ground internally on the memory card and will be forced low whenever a card is placed in a host socket. The present invention implements grounding of the -CD1 and -CD2 signals using electronic means such as an open collector transistor, an integrated circuit driver, or the like. This implementation allows the messaging peripheral 100 to request service from the electronic information processing device 200 by toggling the state of the -CD1 and -CD2 lines, thereby "tricking" the electronic information processing device's PCMCIA interface driver into thinking that the messaging peripheral was temporarily removed (disconnected) from the electronic information processing device 200. Since the PCMCIA interface driver as defined in the PCMCIA specification must interrogate a PCMCIA card when inserted (e.g., when ground is detected on the -CD1 and -CD2 lines), this procedure essentially allows a PCMCIA memory only interface card to request service from a host device in a fashion similar to an interrupt as defined in the PCMCIA I/O interface standard. The WP output signal is used to reflect the status of the card's Write Protect switch. The −REG signal is kept inactive for all Common Memory access. The signals BVD1 and BVD2 are generated by the memory card as an indication of the condition of its battery. The VPP1 and VPP2 signals supply programming voltages for programmable-memory operation, or additional supply voltages for peripheral cards. The Vcc and GND input pins are located at symmetrical positions on the memory card to provide safety in the case of an inverted-card insertion. The Refresh signal is intended for pseudostatic SRAMS (PSRAM). Several pins have been identified as Reserved for Future Use (RFU). The +RESET signal clears the Card Configuration Option Register thus placing a card in an unconfigured (Memory-Only Interface) state. It also signals the beginning of any additional card initialization. The −WAIT signal is asserted by a card to delay completion of the memory-access cycle in progress.

As can be seen from the preceding discussion, using a PCMCIA memory only interface in conjunction with a selective call capable messaging peripheral 100 for message delivery to a electronic information processing device 200 yields distinct advantages in expanding the functionality of the messaging peripheral 100. The interface is capable of adaptive configuration to both 8 and 16 bit wide bus architectures, as well as supporting other features such as low battery detection. A conventional serial interface cannot implement the wide array of features available in the PCMCIA interface standard. Even if some of the simpler features were implemented using a conventional serial interface, the implementation would require added complexity in terms of device and command handlers in both the host and peripheral systems and would not be able to achieve functional equivalence to a PCMCIA implementation.

Figure 5:
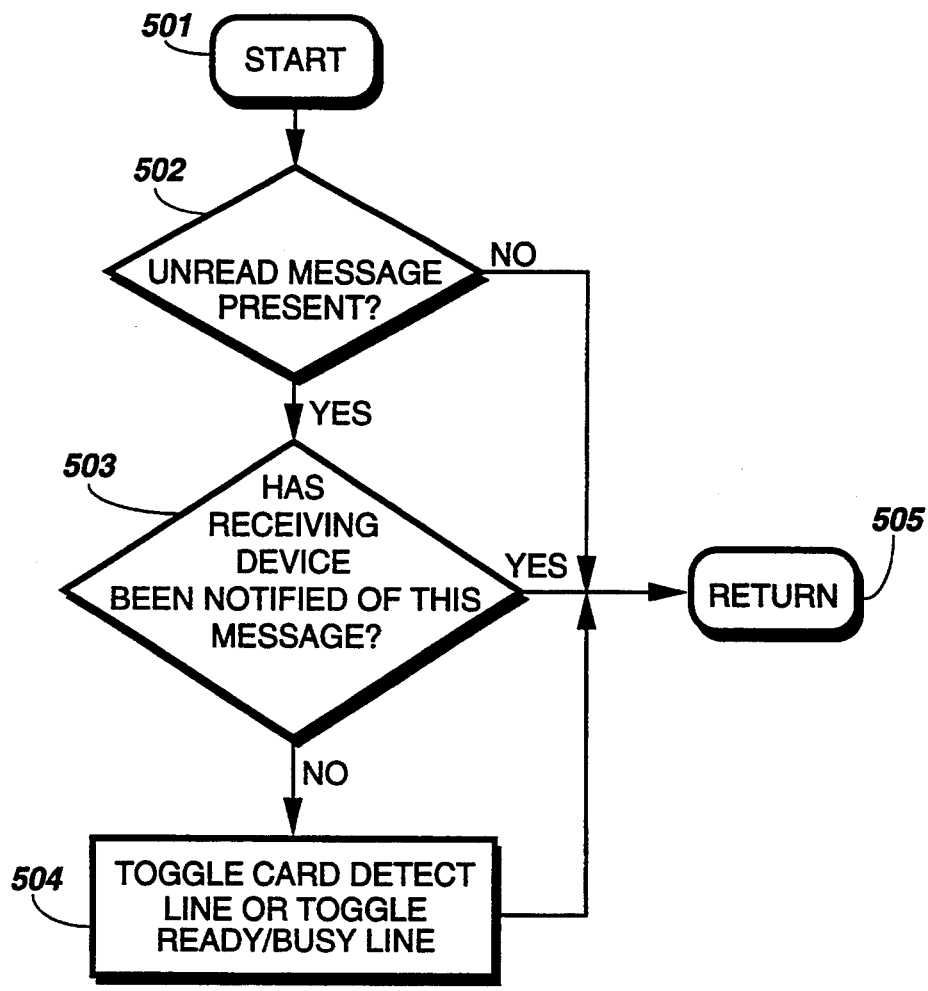
FIG. 5 is a flow diagram illustrating a procedure for the messaging peripheral to notify the electronic information processing device of a received message.

Referring to FIG. 5, the flow diagram illustrates a procedure for the messaging peripheral to notify the electronic information processing device of a message receipt. When a selective call message is received by the messaging peripheral 501, an unread message is stored and step 502 passes control to step 503. Step 503 test for notification of the electronic information processing device. If the device has not been notified, the messaging peripheral 100 communicates notification of the address detection to the electronic information processing device 504. Notification, in this embodiment, can be effected in two ways. First, the electronic information processing device is notified by simulating disengagement of the PCMCIA memory only interface between the messaging peripheral 100 and the electronic information processing device 200, the simulated disengagement causing the electronic information processing device 200 to issue the message read command to the messaging peripheral 100. The simulation is accomplished by changing an impedance present at a connection corresponding with at least one card detect signal (e.g., the -CD1 and -CD2 lines) on the messaging peripheral's PCMCIA memory only interface from a first electrical state approximating a zero impedance reference with respect to a relative ground reference potential for the PCMCIA memory only interface to a second electrical state approximating an infinite impedance and then returning the impedance to the first electrical state. Second, the electronic information processing device 200 is notified by executing a sequence that asserts a PCMCIA busy signal in the messaging peripheral's PCMCIA memory only interface, then releases the PCMCIA busy signal and asserts a PCMCIA ready signal in the selective call messaging peripheral's PCMCIA memory only interface, the sequence causing the electronic information processing device 200 to issue the message read command to the messaging peripheral 100. In each case, the final result is that the electronic information processing device 200 is notified of an unread message received and the message is made available for transfer to and processing by the electronic information processing device 200. When message processing is complete, control is returned to the messaging peripheral's main control program 505.

Figure 6:
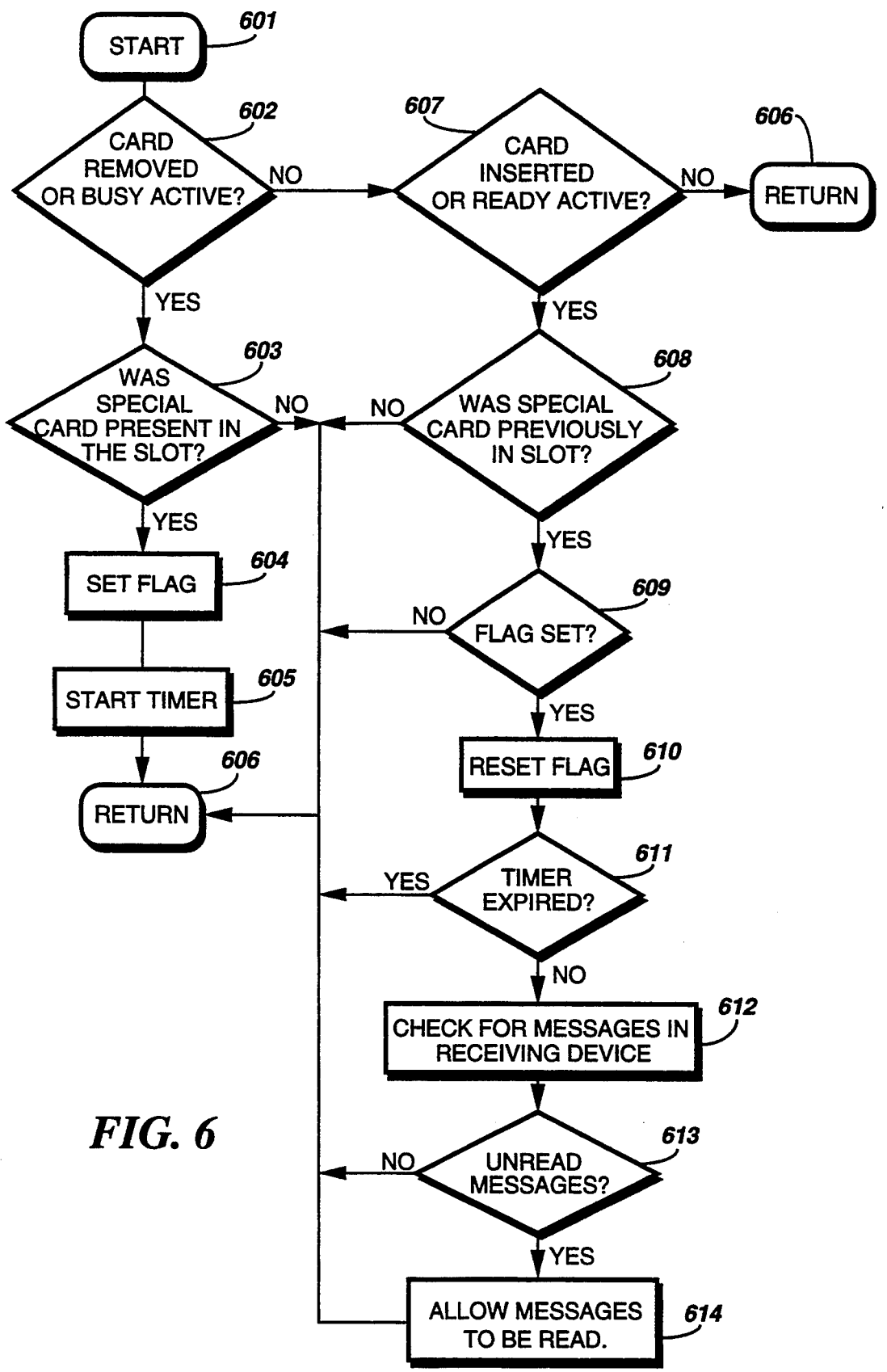
FIG. 6 is a flow diagram illustrating a procedure for the electronic information processing device to respond when notified of the received message by the messaging peripheral in accordance with the preferred embodiment of the present invention.

Referring to FIG. 6, the flow diagram illustrates a procedure for the electronic information processing device 200 to respond when notified of the message receipt by the messaging peripheral 100. The procedure starts 601 and checks for either the card detect signal being false (indicating the card has been removed) or the PCMCIA memory only interface busy signal being asserted 602. If either of these conditions are affirmed, step 603 determines if a "special" card (e.g., a messaging peripheral card or the like) was present in the PCMCIA memory only interface slot. If the special card was present, a flag indicating its presence is set 604, a time-out timer started 605, and control is returned to the electronic information processing device's main control program 505. After determining that a messaging peripheral card has been removed and reinserted (or the PCMCIA interface signals CD1, CD2, indicate such an event has occurred) 602, 603 and that a special card was present in the PCMCIA memory only interface slot 609, and that the flag indicating a card was present is set 609, the flag is reset 610 and the time-out time checked to prevent a false indication of unread messages. If the timer had not expired, the electronic information processing device issues a message read command to the messaging peripheral card 100 via the memory only PCMCIA interface 612. If there are unread messages 613, the electronic information processing device 200 addresses the messaging peripheral card 100 and may read the unread messages into its RAM, store them in its mass storage, or present them on its display. When message processing is complete, control is returned to the electronic information processing device's main control program 505.

Figure 7:
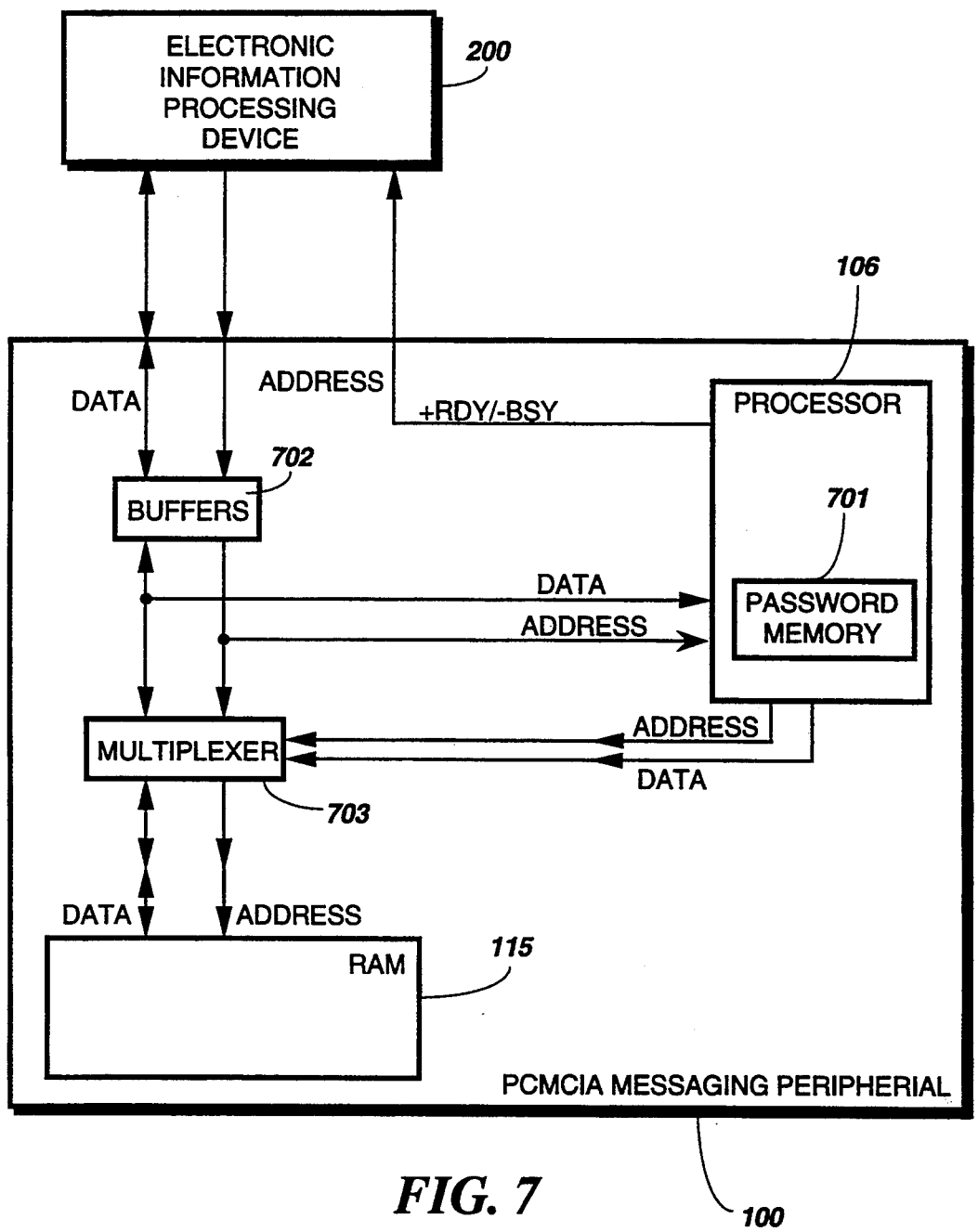
FIG. 7 is a block diagram of a messaging peripheral having a secure memory access interface that facilitates password protection of received messages in accordance with the preferred embodiment of the present invention.

Referring to FIG. 7, the block diagram shows a messaging peripheral 100 having a secure memory access interface 703 that facilitates password protection of received messages in accordance with the preferred embodiment of the present invention. The messaging peripheral 100 is capable of communicating with an electronic information processing device 200 such as discussed in reference to FIGS. 5 and 6, and further as will be discussed in reference to FIG. 8.

In accordance with the preferred embodiment, the messaging peripheral 100 comprises a processor 106 for executing a microcode program that controls operation of the messaging peripheral, a PCMCIA memory only interface 119 coupled to and controlled by the processor 106, the PCMCIA memory only interface 119 serving to allow communication of at least one message and a user selectable password between the electronic information processing device 200 and the messaging peripheral 100. The messaging peripheral 100 further comprises a password memory 701 for storing the user selectable password, and a conventional electronic buffer 702 (e.g., a tri-state memory interface) for conditioning memory address and data signals that are coupled to the processor 106 and the messaging peripheral's RAM memory 115. The password memory 701 is shown as part of the processor 106 but, as with the messaging peripheral's RAM memory 115, may be incorporated in any memory device within the PCMCIA messaging peripheral 100. In the preferred embodiment of the instant invention, both the password memory 701 and the messaging peripheral's RAM memory 115 are contained in a single physical electronic memory device. For added security, one may separate the memory partitions and locate them in different physical devices to deter tampering and further increase security.

The memory access interface implements a conventional address comparator (not shown) in the processor 106. To access messages stored in the messaging peripheral's RAM memory 115, the electronic information processing device 200 addresses the PCMCIA messaging peripheral 100 with a predetermined password access address and couples a user entered password to the processor 106. The processor 106 compares the user entered password with the user selectable password, and upon a match, activates the secure memory access interface 703 for read access, allowing the electronic information processing device 200 to download any messages present in its RAM memory 115. As one of ordinary skill in the art would appreciate, this procedure may be implemented in any number of ways, all of which fall within the scope of the invention described herein.

Several operational advantages are achieved by the instant invention. By using a PCMCIA memory-only interface standard in implementing the messaging peripheral 100, the electronic information processing device 200 simply requests access to an area in the address space of the messaging peripheral's RAM memory 115. This operation is conventional and falls squarely within the PCMCIA memory-only interface specification. What is unconventional is that the address and its corresponding data are not immediately directed to the RAM 115, but rather, the processor 106 intercepts and interprets the address and directs the corresponding data to the processor 106 for comparison with the user selectable password. This scheme effectively implements a hardware (or possibly software, depending on a designer's standpoint) security protection scheme for messages stored in RAM 115. Thus, if one's PCMCIA card is lost or stolen, the messaging data contained therein is not accessible without knowing the proper access password.

Figure 8:
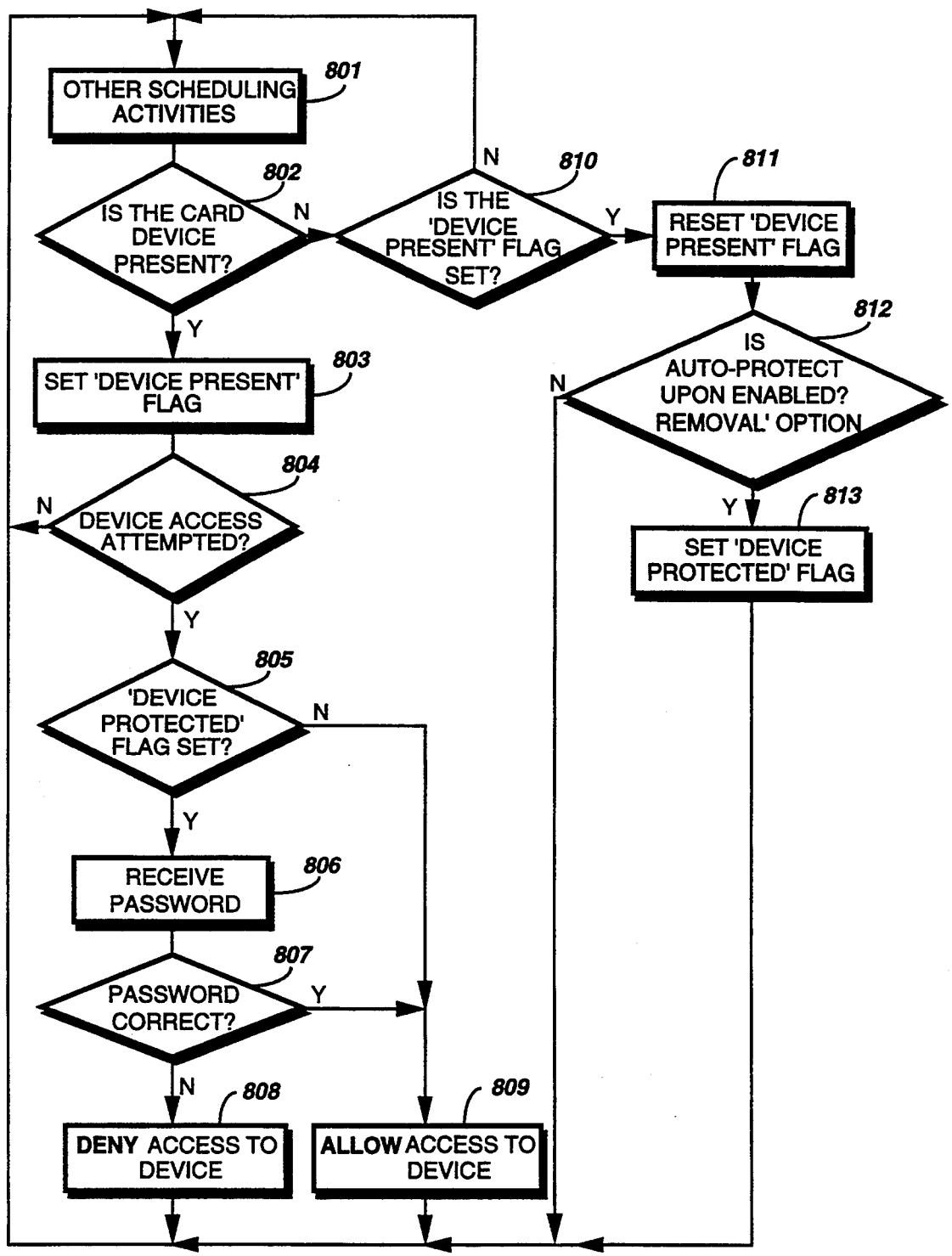
FIG. 8 is a flow diagram illustrating a procedure embodied in the messaging peripheral for protecting and accessing the password protected messages stored in the messaging peripheral in accordance with the preferred embodiment of the present invention.

Referring to FIG. 8, the flow diagram illustrates a procedure embodied in the messaging peripheral 100 for protecting and accessing the password protected messages stored in the messaging peripheral in accordance with the preferred embodiment of the present invention.

The processor 106 idles in step 801 servicing scheduling activities such as battery saving, message decoding, or the like. When the card is inserted in the electronic information processing device 200 (card device), step 802 is true and a device present flag is set 803. If message access is attempted 804 by the card device 200, the status of a "device protected" flag is tested 805. If the device protected flag is set, a password is required to allow access to any messages stored in the messaging peripheral's RAM 115. A user enters a password in the electronic information processing device via a keyboard or the like. The user entered password is communicated to the messaging peripheral 806 where a correlation 807 is performed between the user entered password and the user selectable password. When the user entered password substantially coincides with the user selectable password or if the device protected flag is clear 805, the electronic information processing device may access the at least one message 809. Alternatively, if the user entered password doesn't substantially coincide with the user selectable password, access to the at least one message 809 is denied 808.

When the card is removed from the electronic information processing device 200, step 802 is false and the device present flag is tested 810. If the device present flag was set, it is cleared 811 by the processor. The processor then tests 812 whether the user has selected a memory protection mode that automatically protects access to the at least one message. If the auto-protect mode is selected, the processor sets the device protected flag 813, thus requiring the entry of the user entered password to access any received messages when the messaging peripheral is re-inserted in the electronic information processing device.

What is claimed is:

1. A messaging peripheral capable of communicating with an electronic information processing device, the messaging peripheral comprising:
   a processor for executing a microcode program that controls operation of the messaging peripheral;
   a PCMCIA memory only interface coupled to and controlled by the processor, the PCMCIA memory only interface serving to allow communication of at least one message and a user selectable password between the electronic information processing device and the messaging peripheral, and
   a secure memory access interface comprising a selectably activated address multiplexer that is controlled by the processor and coupled to the PCMCIA memory only interface, the secure memory access interface allowing the electronic information processing device to access the at least one message stored in at least a portion of a messaging peripheral RAM when a memory protection mode is selected and the processor receives a user entered password and performs a correlation between the user entered password and the user selectable password.

2. The messaging peripheral according to claim 1 wherein access to the at least one message is permitted by the processor only when the user entered password substantially coincides with the user selectable password.

3. The messaging peripheral according to claim 1 wherein the memory protection mode is automatically enabled in response to removal of the messaging peripheral from the electronic information processing device when an auto-protect mode is selected.

4. The messaging peripheral according to claim 1 wherein the secure memory access interface when enabled allows the at least a portion of the messaging peripheral RAM coupled to the secure memory access interface containing received messages to be read by the electronic information processing device.

5. The messaging peripheral according to claim 1 wherein the secure memory access interface when disabled prevents the electronic information processing device from reading the at least a portion of the messaging peripheral RAM coupled to the secure memory access interface containing received messages.

6. The messaging peripheral according to claim 1 wherein the secure memory access interface allows the at least a portion of the messaging peripheral RAM coupled to the secure memory access interface containing received messages to be read by the electronic information processing device without requiring the user entered password when the memory protection mode is not selected.

7. A messaging peripheral capable of communicating with an electronic information processing device, the messaging peripheral comprising:
   a processor for executing a microcode program that controls operation of the messaging peripheral;
   a receiver coupled to the processor, the receiver operating to receive and demodulate an information signal providing a recovered information signal including an address signal and at least one message;
   a correlator coupled to the receiver, the correlator performing a comparison between the address signal recovered from the received information signal and a predetermined address associated with the messaging peripheral, the correlator generating an address detection when the recovered address is substantially equivalent to the predetermined address indicating selection of the messaging peripheral and processing of the at least one message;
   a PCMCIA memory only interface coupled to and controlled by the processor, the PCMCIA memory only interface serving to allow communication of at least one message and a user selectable password between the electronic information processing device and the messaging peripheral, and
   a secure memory access interface comprising a selectably activated address multiplexer that is controlled by the processor and coupled to the PCMCIA memory only interface, the secure memory access interface allowing the electronic information processing device to access the at least one message stored in at least a portion of a messaging peripheral RAM when a memory protection mode is selected and the processor receives a user entered password and performs a correlation between the user entered password and the user selectable password.

8. The messaging peripheral according to claim 7 wherein access to the at least one message is permitted by the processor only when the user entered password substantially coincides with the user selectable password.

9. The messaging peripheral according to claim 7 wherein the memory protection mode is automatically enabled in response to removal of the messaging peripheral from the electronic information processing device when an auto-protect mode is selected.

10. The messaging peripheral according to claim 7 wherein the secure memory access interface when enabled allows the at least a portion of the messaging peripheral RAM coupled to the secure memory access interface containing received messages to be read by the electronic information processing device.

11. The messaging peripheral according to claim 7 wherein the secure memory access interface when disabled prevents the electronic information processing device from reading the at least a portion of the messaging peripheral RAM coupled to the secure memory access interface containing received messages.

12. The messaging peripheral according to claim 7 wherein the secure memory access interface allows the at least a portion of the messaging peripheral RAM coupled to the secure memory access interface containing received messages to be read by the electronic information processing device without requiring the user entered password when the memory protection mode is not selected.

13. A selective call receiver capable of receiving at least one selective call message and communicating the at least one selective call message to an electronic information processing device, the selective call receiver comprising:
   a microcontroller including a processor for executing a microcode program that controls operation of the selective call receiver;
   a receiver coupled to and controlled by the microcontroller, the receiver being capable of receiving and demodulating an information signal to provide a recovered information signal;
   a detector for recovering a serial bit stream from the recovered information signal, the serial bit stream comprising an address signal, an address correlator responsive to the address signal, the address correlator operating to generate a selective call address detection when the recovered address is substantially equivalent to a predetermined address indicating selection of the selective call receiver;

a decoder operating to decode the at least one selective call message from the recovered information signal and store the at least one selective call message in at least one electronic memory in response to the selective call address detection;

a PCMCIA memory only interface coupled to and controlled by the processor, the PCMCIA memory only interface serving to allow communication of at least one message and a user selectable password between the electronic information processing device and the messaging peripheral, and a secure memory access interface comprising a selectably activated address multiplexer that is controlled by the processor and coupled to the PCMCIA memory only interface, the secure memory access interface allowing the electronic information processing device to access the at least one message stored in at least a portion of a messaging peripheral RAM when a memory protection mode is selected and the processor receives a user entered password and performs a correlation between the user entered password and the user selectable password.

14. The selective call receiver according to claim 13 wherein access to the at least one message is permitted by the processor only when the user entered password substantially coincides with the user selectable password.

15. The selective call receiver according to claim 13 wherein the memory protection mode is automatically enabled in response to removal of the messaging peripheral from the electronic information processing device when an auto-protect mode is selected.

16. The selective call receiver according to claim 13 wherein the secure memory access interface when enabled allows the at least a portion of the messaging peripheral RAM coupled to the secure memory access interface containing received messages to be read by the electronic information processing device.

17. The selective call receiver according to claim 13 wherein the secure memory access interface when disabled prevents the electronic information processing device from reading the at least a portion of the messaging peripheral RAM coupled to the secure memory access interface containing received messages.

18. The selective call receiver according to claim 13 wherein the secure memory access interface allows the at least a portion of the messaging peripheral RAM coupled to the secure memory access interface containing received messages to be read by the electronic information processing device without requiring the user entered password when the memory protection mode is not selected.

* * * * *